United States Patent
Olsen

(10) Patent No.: US 7,449,051 B2
(45) Date of Patent: Nov. 11, 2008

(54) SEPARATION OF LIQUID AND GAS FROM FROTH

(75) Inventor: David Olsen, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 644 days.

(21) Appl. No.: 11/133,609

(22) Filed: Jul. 11, 2005

(65) Prior Publication Data

US 2007/0006735 A1    Jan. 11, 2007

(51) Int. Cl.
    *B01D 19/00* (2006.01)
(52) U.S. Cl. ............... 95/242; 95/266; 95/46; 96/176; 96/197; 96/6; 96/179; 347/92
(58) Field of Classification Search .......... 95/242, 95/266, 46; 96/176, 193, 194, 197, 6, 179; 347/92
    See application file for complete search history.

(56) References Cited

U.S. PATENT DOCUMENTS

| | | | |
|---|---|---|---|
| 2,800,459 A | 7/1957 | Dijksman et al. | |
| 2,813,833 A | 11/1957 | Revallier | |
| 4,170,457 A | 10/1979 | Tetro | |
| 4,256,470 A | 3/1981 | Zajicek et al. | |
| 4,525,182 A * | 6/1985 | Rising et al. .................. 96/6 |
| 4,931,072 A | 6/1990 | Striedieck | |
| 4,961,082 A * | 10/1990 | Hoisington et al. .......... 347/92 |
| 5,587,004 A | 12/1996 | Mogi | |
| 6,342,092 B1 | 1/2002 | Lichon et al. | |
| 6,454,835 B1 * | 9/2002 | Baumer ........................ 95/19 |
| 6,520,632 B1 * | 2/2003 | Yamazaki et al. ............. 347/92 |
| 2003/0183081 A1 | 10/2003 | Gaues et al. | |

FOREIGN PATENT DOCUMENTS

EP      1219333 A1 *    7/2002
JP      54133334 A      10/1979

\* cited by examiner

*Primary Examiner*—Robert A Hopkins
*Assistant Examiner*—Douglas J Theisen

(57) ABSTRACT

Froth is directed through a flow passage bounded by a filter and a non-porous surface, and liquid is drawn from the froth through the filter as the froth flows through the flow passage.

39 Claims, 11 Drawing Sheets ated subject matter is defined only by the appended claims and equivalents thereof.

SEPARATION OF LIQUID AND GAS FROM FROTH

BACKGROUND

Froth (e.g., a mixture of liquid and gas, wherein the gas bubbles form in or on the liquid) often forms as fluids are pumped. In some applications, the froth may occupy a volume otherwise needed for containing pure liquid. For some imaging devices, froth produced from marking fluid could spill into the interiors of these devices resulting in lost useable marking fluid, internal printer damage, damage to users' property, etc.

One common method for reducing froth involves providing extra space and/or time for the froth to accumulate and then dissipate. However, for continuous pumping and/or limited space and/or time, this method is not always desirable. Other solutions include adding chemicals to the fluid to break up the bubble infrastructure. These additives can change the composition of the fluid, often making it unusable. Another method is to add mechanical force to break up the froth, but this can produce more froth.

DETAILED DESCRIPTION

In the following detailed description of the present embodiments, reference is made to the accompanying drawings that form a part hereof, and in which is shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
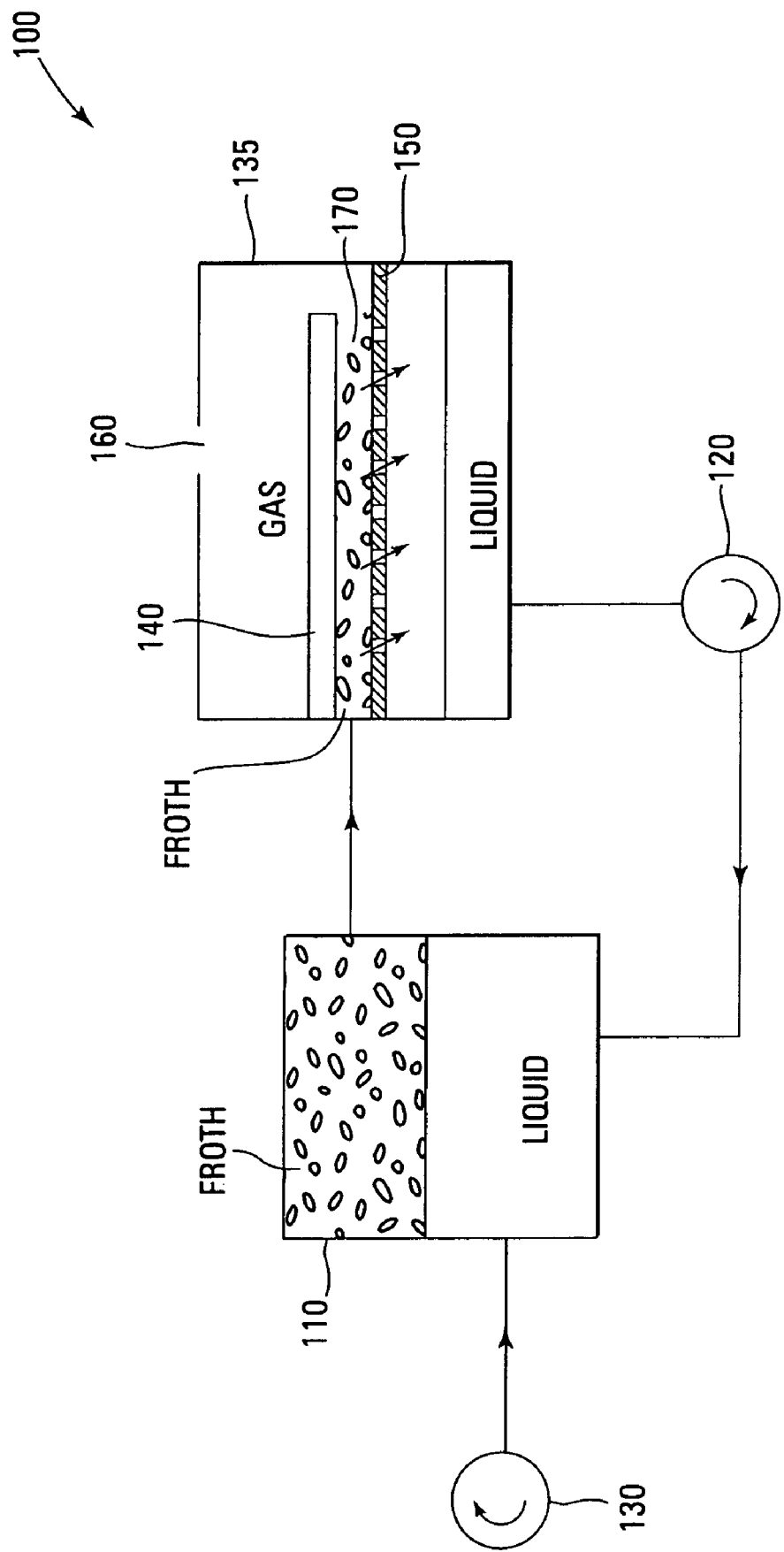
FIG. 1 illustrates an embodiment of a froth-liquid/gas separator, according to an embodiment of the disclosure.

FIG. 1 illustrates a froth-liquid/gas separator 100 as a portion of a fluid handling system, according to an embodiment. Froth-liquid/gas separator 100 is fluidly coupled for input and output to a reservoir 110 of the fluid handling system. A pump 120 is coupled between an outlet of froth-liquid/gas separator 100 and an inlet of reservoir 110.

For one embodiment, a mixture of liquid, gas, and froth is pumped into reservoir 110 using a pump 130. The froth rises to an upper portion of reservoir 110. This froth is displaced by additional liquid, gas, and froth that are pumped into reservoir 110 and flows from reservoir 110 to froth-liquid/gas separator 100. The froth subsequently flows through a closed flow passage 170 (e.g., a conduit or the like) located within a housing 135 of froth-liquid/gas separator 100 and formed between a non-porous bounding surface 140, such as formed by a plate, and a filter (e.g., a porous bounding surface or the like) 150. Note that filter 150 divides housing 135 into upper and lower portions.

As the froth flows through the flow passage, e.g., substantially parallel to non-porous bounding surface 140 and filter 150 in this example, a liquid portion of the froth wets filter 150, effectively sealing the filter. For some embodiments, it may be necessary to pre-wet filter 150 to prevent gas from passing through it. Sealing filter by wetting enables pump 120 to produce a suction pressure, e.g., a vacuum, in the lower portion of housing 135 and thus on the lower (or outer) surface of filter 150 exteriorly of the flow passage. Note that the pressure at the inlet of the flow passage is greater than the suction pressure. Since the exit of the flow passage is open to the upper portion of housing 135, the upper portion is about the same pressure as the pressure at the inlet of the flow passage, less any hydrodynamic losses in the flow passage. This sets up a pressure differential between the flow passage and the lower portion of housing 135 across filter 150.

As long as the suction pressure on the lower surface of filter 150 does not exceed a screen or an orifice bubble pressure of filter 150, substantially only liquid will be pulled through filter 150, e.g., substantially perpendicular to the flow passage and thus substantially perpendicular to the froth flow in this example, under the pressure differential across filter 150. As the froth flows over the filter, the froth is reduced as the liquid and gas therein are separated. In this example, the gas from the bubble is subsequently vented to atmosphere through a vent 160 of the froth-liquid/gas separator 100. In other exemplary implementations, the gas may be contained or otherwise processed in some manner to prevent it from entering into the atmosphere. Confining the froth to the flow passage acts to improve the liquid removal by the suction as the froth flows over the filter. This is illustrated in FIG. 2 for a flow passage 260, according to another embodiment.

Figure 2:
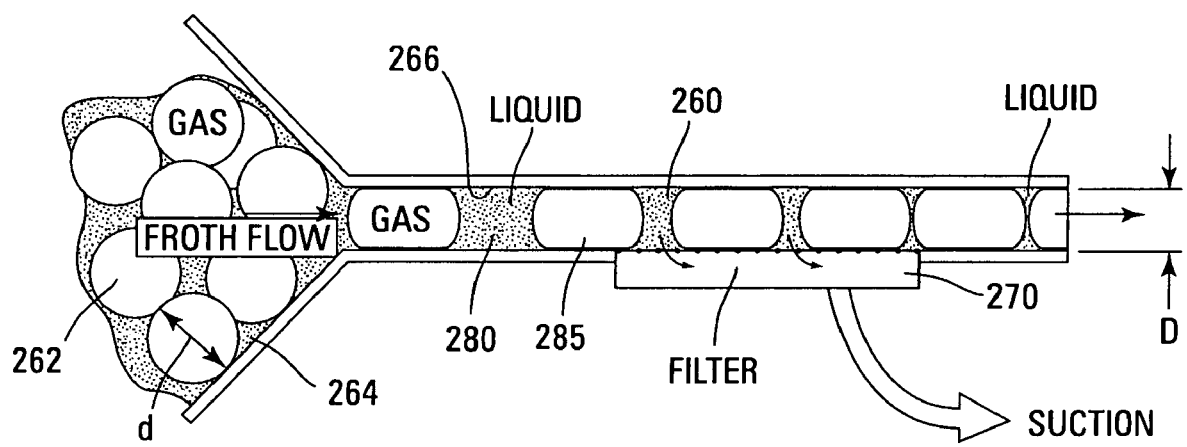
FIG. 2 illustrates an embodiment of froth-liquid/gas separation, according to an embodiment of the disclosure.

FIG. 2 illustrates that before entering flow passage 260, the froth contains generally spherically shaped gas bubbles 262 dispersed in liquid 264 and having a general diameter d. Note that for one embodiment, a separation distance D between the bounding surfaces of flow passage 260, e.g., a non-porous bounding surface 266 and a filter 270, is less than or equal to the diameter d of the generally spherically shaped gas bubbles within the froth before the froth enters flow passage 260, as illustrated in FIG. 2. As the froth enters flow passage 260, the froth is separated into liquid components, or liquid slugs, 280 and gaseous components, or generally oblate spherical gas bubbles, 285. This is due to the separation distance D being less than the diameter d of the gas bubbles before the entering flow passage 260. Note that the generally spherical shaped gas bubbles are forced into oblate spheres. For one embodiment, the separation distance D is about 0.5 mm to about 2.0 mm.

The separated liquid slugs 280 and generally oblate spherical gas bubbles 285 permit the suction to work on liquid slugs 280 rather than contending with surface tension forces inherent in the froth lamella. When a gas bubble 285 reaches the end of the filter area near the exit of the flow passage 260, it attempts to re-form the spherical shape it had before being confined. However, there may not be enough liquid left to reform a complete lamella and the bubble bursts.

Figure 3:
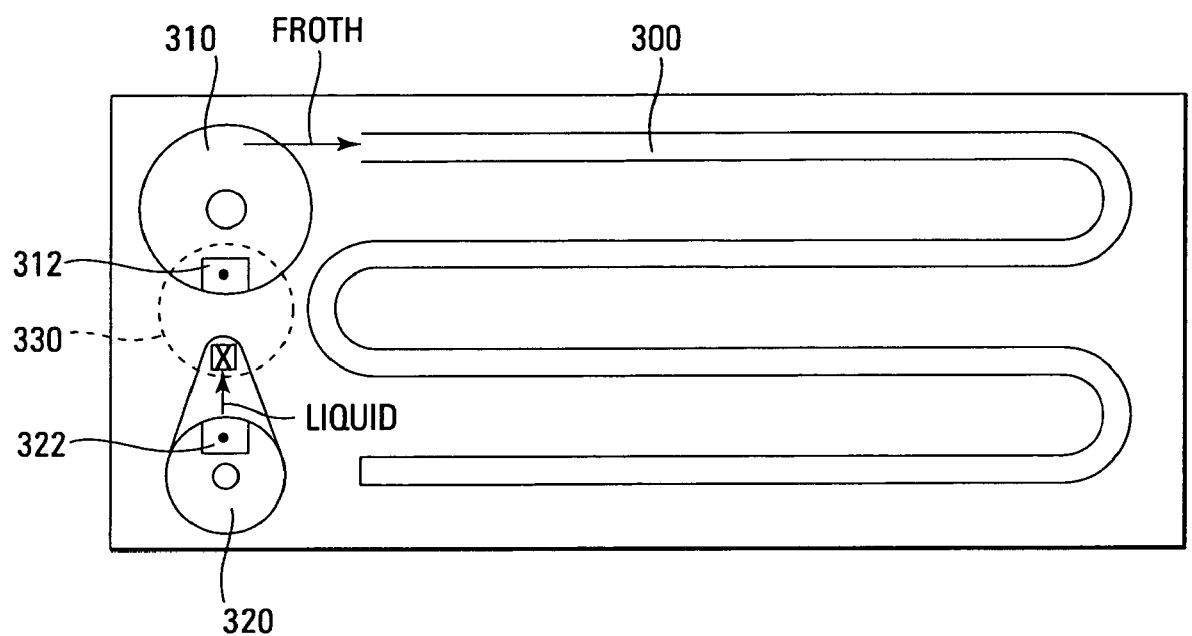
FIG. 3 illustrates an embodiment of a froth flow passage, according to an embodiment of the disclosure.

For one embodiment, the flow passage may have a rectangular or square cross-section, where one of the bounding walls is porous (or of a filter material). For another embodiment, the flow passage may have a labyrinth or serpentine shape as shown in FIG. 3. This may be accomplished be covering one side of serpentine channel 300 of FIG. 3 with a plate and the opposite side with a filter. The serpentine shape acts to increase the length of the flow passage, thus increasing the flow residence time within the flow passage and the time available for liquid removal. For other embodiments, the serpentine shape may be advantageous for applications involving limited space, such as applications involving marking fluid handling for imaging devices.

For one embodiment, the following equation for the bubble pressure may be used for setting the suction pressure:

$$P_{bubble} = (2\sigma \cos \theta)/r \quad (1)$$

where $\sigma$ is the surface tension of the liquid component of the froth, $\theta$ is the contact angle of the liquid to the filter, and r is an effective or wetted radius of the pores of the filter.

Figure 4:
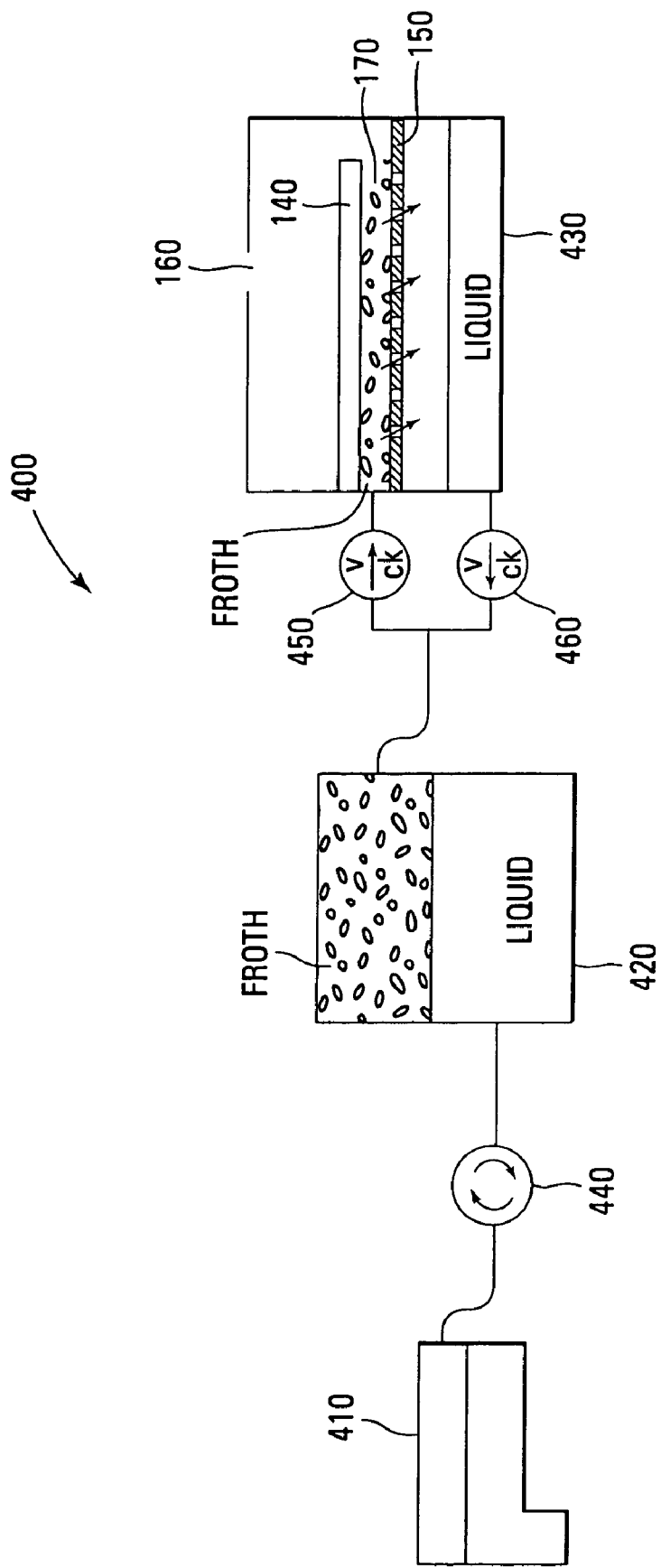
FIG. 4 illustrates an embodiment of a fluid-handling system, according to an embodiment of the disclosure.

FIG. 4 illustrates a fluid-handling system 400, e.g., as a portion of an ink-jet imaging device, such as printer, copier, facsimile device, all-in-one device, etc., for another embodiment. For one embodiment, fluid-handling system 400 includes a fluid-ejection device 410, e.g., a print head, fluidly coupled to a reservoir 420 that for another embodiment, contains liquid, e.g., a marking fluid, such as ink. Reservoir 420 is in turn fluidly coupled to a froth-liquid/gas separator 430 that for one embodiment is as described above for froth-liquid/gas separator 100 of FIG. 1. Common reference numbers indicate substantially similar components of froth-liquid/gas separator 430 and froth-liquid/gas separator 100. For another embodiment, a two-way pump 440, e.g., a two-way peristaltic pump, is coupled between fluid-ejection device 410 and reservoir 420.

In operation, liquid and gas are pumped between fluid-ejection device 410 and reservoir 420 to supply the liquid to fluid-ejection device 410 or to remove the gas from fluid-ejection device 410. This pumping action generates froth in the liquid that accumulates on or above the liquid in reservoir 420.

When pump 440 is pumping gas from fluid-ejection device 410 to reservoir 420, the pressure causes the froth to flow from reservoir 420 through an inlet check valve 450 to froth-liquid/gas separator 430 and into the flow passage 150 between non-porous bounding surface 140 and filter 150. As this is occurring, an outlet check valve 460 from froth-liquid/gas separator 430 remains closed. When the pump 440 is reversed to pump liquid from reservoir 420 to fluid-ejection device 410, inlet check valve 450 closes and keeps the upper portion pressurized and outlet check valve 460 opens. This produces suction below filter 150 that pulls the liquid from the froth through filter 150 into the lower portion of froth-liquid/gas separator 430. Subsequently, the liquid exits froth-liquid/gas separator 430, flows through outlet check valve 460 and into reservoir 420. When pump 440 pumps gas from fluid-ejection device 410 to reservoir 420 again, outlet check valve 460 closes, keeping the lower portion pressurized at a lower pressure than the upper portion, and inlet check valve 450 opens. Note that the action of inlet check valve 450 and outlet check valve 460 acts to maintain a pressure differential across filter 150.

FIG. 3 illustrates an implementation of the check valves for serpentine flow passage 300, according to another embodiment. This implementation involves using an inlet disc check valve 310 and an outlet disc check valve 320 that are coupled to an inlet/outlet port 330 that is coupled to a reservoir, such as reservoir 420 of FIG. 4. In operation, froth flows through an inlet 312 of inlet disc check valve 310, as indicated by a dot and is directed into serpentine flow passage 300. An inlet 322 of outlet disc check valve 320 is coupled to a chamber (not shown in FIG. 3) located below the filter (not shown in FIG. 3) at the bottom of serpentine flow passage 300. During the suction phase, the liquid passes through inlet 322, as indicated by a dot, flows to inlet/outlet port 330, as indicated by an arrow, and flows through inlet/outlet port 330, as indicated by an "x."

Figure 5A:
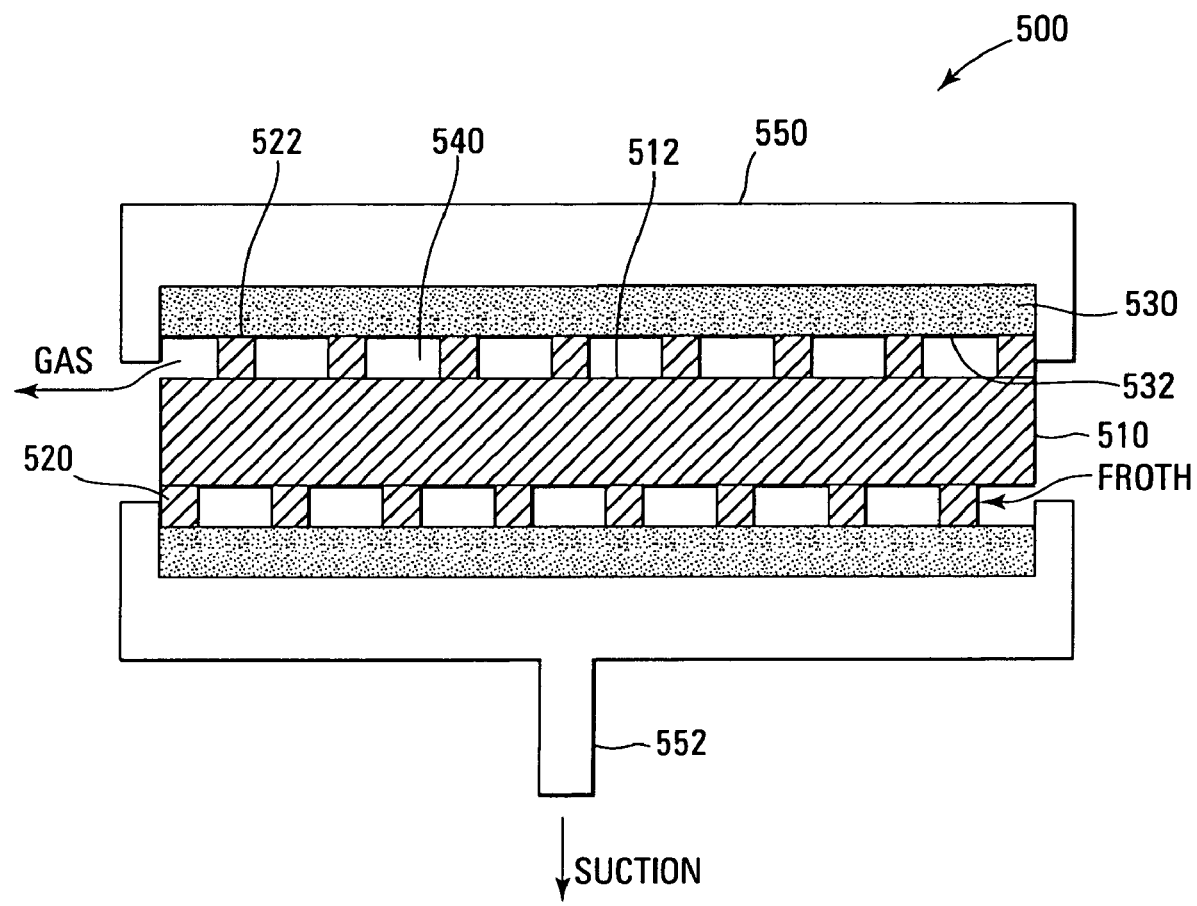
FIG. 5A is a cross-sectional view of another embodiment of a froth-liquid/gas separator, according to an embodiment of the disclosure.
Figure 5B:
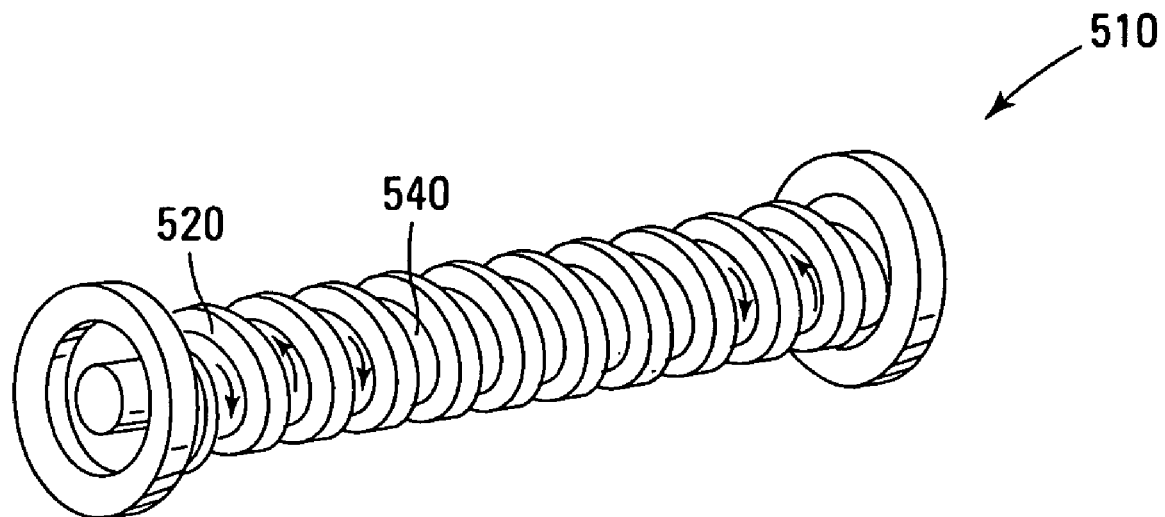
FIG. 5B is an isometric view of an embodiment of a cylindrical core of a froth-liquid/gas separator, according to another embodiment of the disclosure.
Figure 5C:
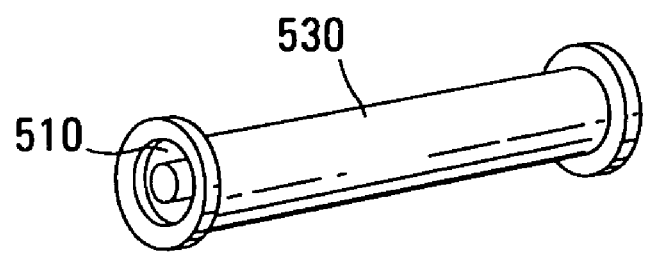
FIG. 5C is an isometric view showing a filter disposed around a core of a froth-liquid/gas separator, according to another embodiment of the disclosure.
Figure 5D:
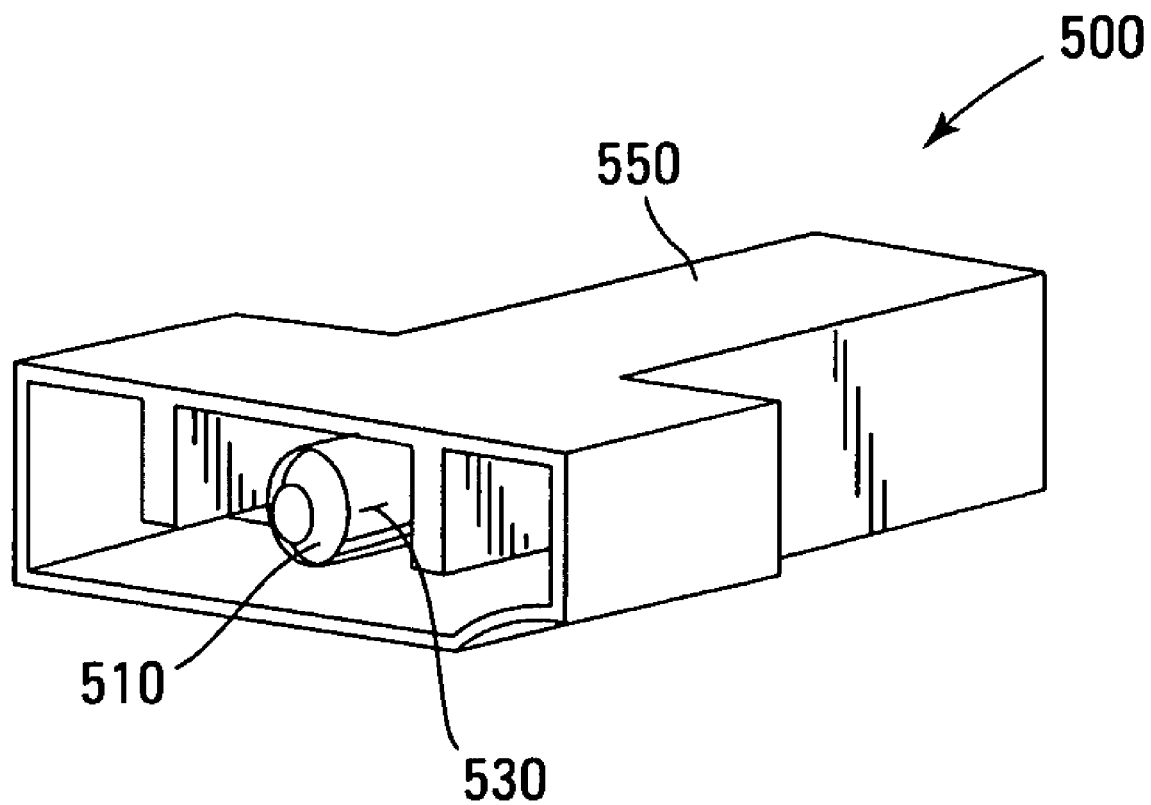
FIG. 5D is an isometric view of another embodiment of a froth-liquid/gas separator, according to another embodiment of the disclosure.

FIG. 5A is a cross-sectional view of a froth-liquid/gas separator 500, according to another embodiment. Froth-liquid/gas separator 500 includes a cylindrical core 510 having a helical rib 520 that is spirals around its outer curved surface 512. FIG. 5B is an isometric view of cylindrical core 510, according to another embodiment. A filter (e.g. a porous membrane or the like) 530 is disposed around helical rib 520 so that an inner surface 532 of filter 530 contacts a curved edge 522 of helical rib 520. This forms a helical flow passage 540 between outer curved surface 512 of cylindrical core 510 and inner surface 532 of filter 530. Note that filter 530 is coaxial with core 510 for one embodiment. FIG. 5C is an isometric view showing filter 530 disposed around helical rib 520, according to another embodiment. For one embodiment, a housing 550 is disposed around filter 530. For another embodiment, housing 550 may be a tube coaxial with filter 530 and core 510, a rectangular housing, etc. FIG. 5D is an isometric view of froth-liquid/gas separator 500, according to another embodiment.

In operation, froth flows through helical flow passage 540 and a suction pressure is exerted at an outlet 552 of housing 550. The suction pulls the liquid from the froth through filter 530, into housing 550, and out through outlet 552. Gas exits helical flow passage 540.

Figure 6:
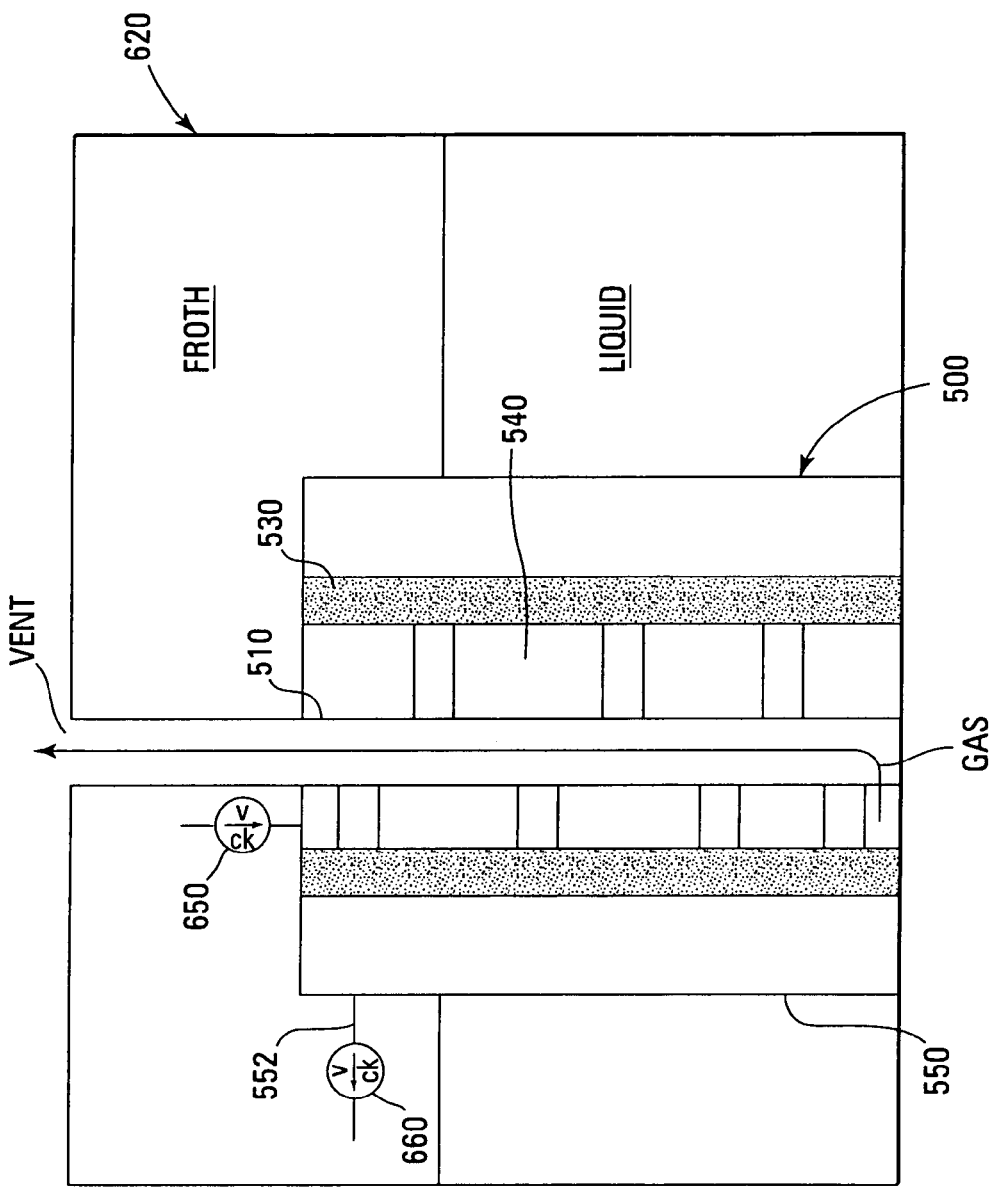
FIG. 6 illustrates another embodiment of a froth-liquid/gas separator disposed within a reservoir, according to an embodiment of the disclosure.

FIG. 6 illustrates froth-liquid/gas separator 500 disposed within a reservoir 620 as a portion of a fluid-handling system, such as fluid-handling system 400, according to an embodiment. Note that for one embodiment, an inlet check valve 650 is coupled to helical flow passage 540 and an outlet check valve 660 is coupled to outlet 552 of housing 550. Froth enters helical flow passage 540 through inlet check valve 650 and flows through helical flow passage 540 while outlet check valve 660 is closed. Suction applied to outlet check valve 660 draws the liquid from the froth through filter 530 while inlet check valve 650 is closed. Note that as describe above, the action of the check valves maintains a pressure differential across the filter. For one embodiment, the core 510 may be hollow and coupled to an exit of helical flow passage 540 for venting gas at the end of helical flow passage 540 to atmosphere.

Figure 7A:
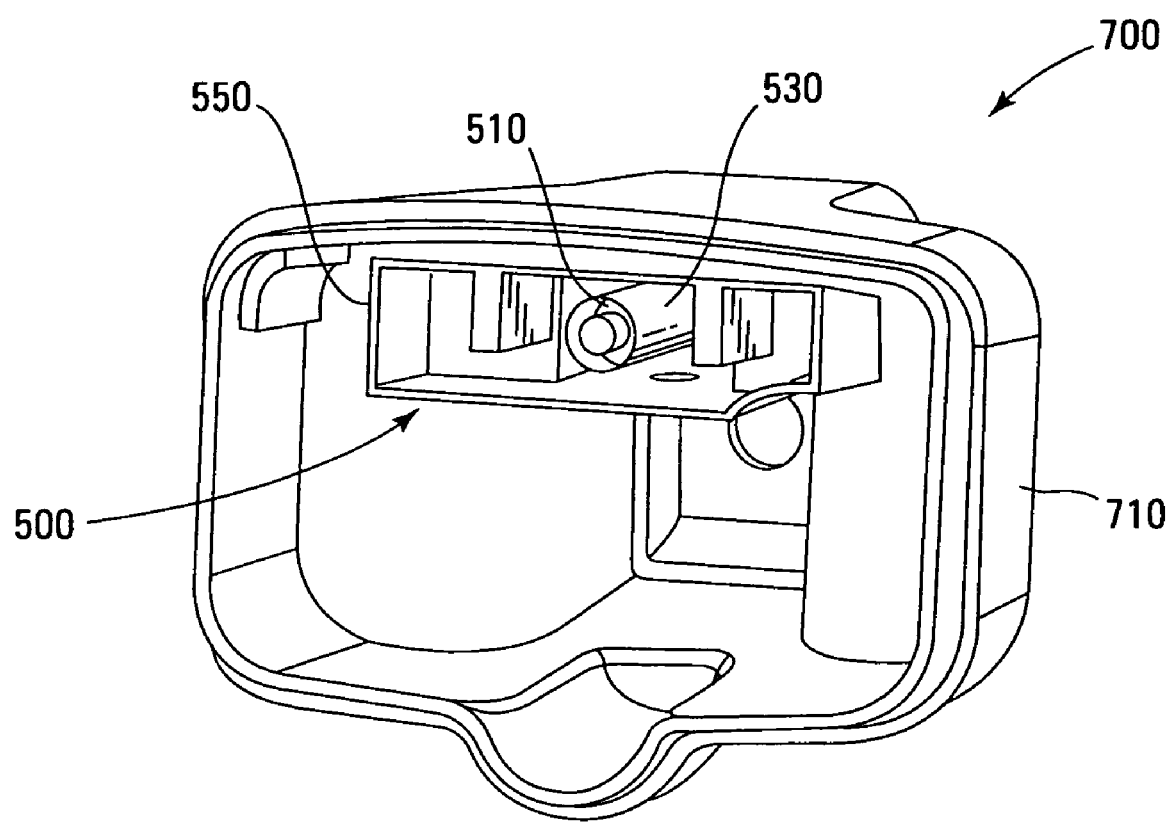
FIG. 7A is an isometric view of a body of a print cartridge with a cover removed showing an embodiment of a froth-liquid/gas separator disposed in the body, according to another embodiment of the disclosure.
Figure 7B:
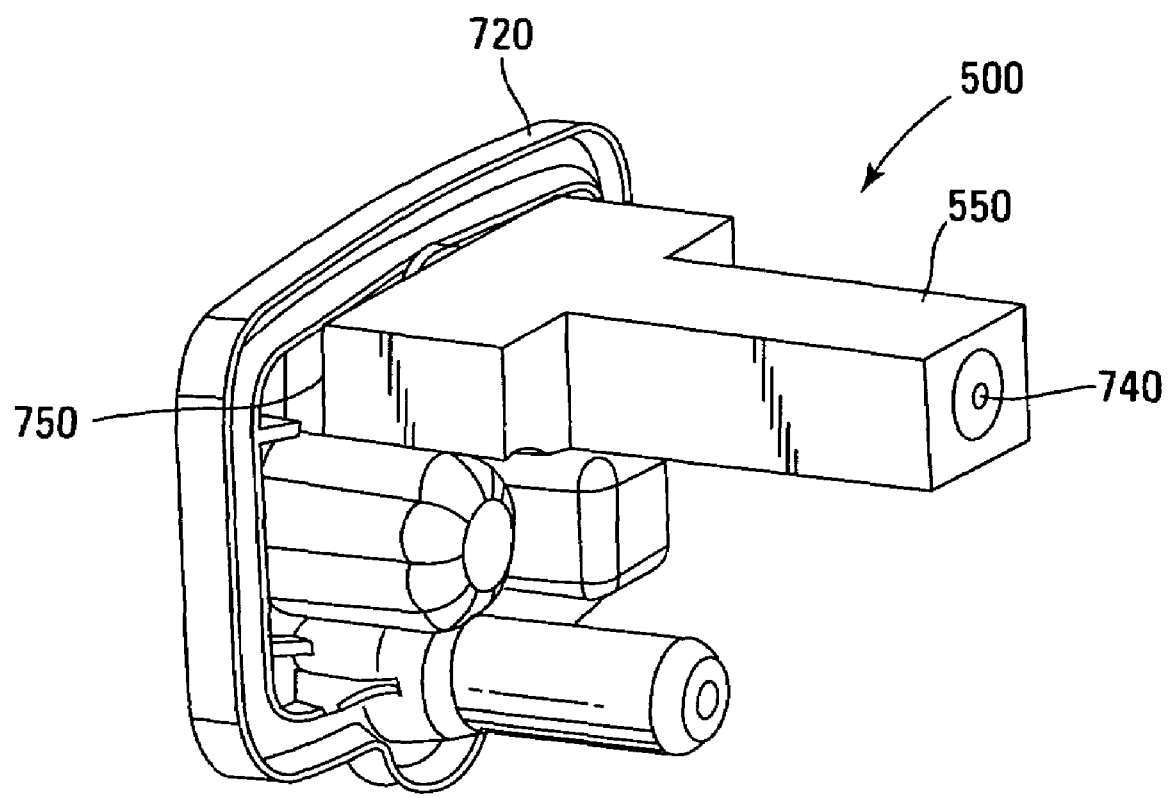
FIG. 7B is an isometric view of a cover of the print cartridge of FIG. 7A with the body removed, showing the froth-liquid/gas separator connected to the cover.
Figure 7C:
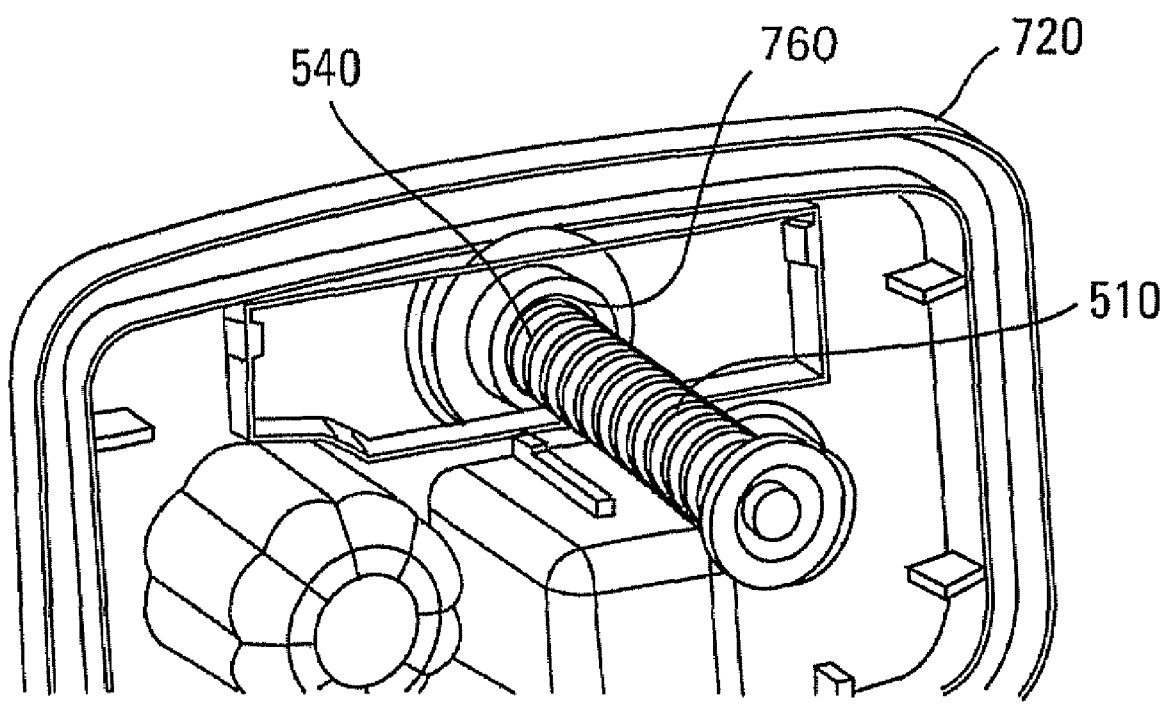
FIG. 7C illustrates the cover of FIG. 7B and shows a core of the froth-liquid/gas separator connected thereto.

FIG. 7A is an isometric view of a body 710 of a portion of a print cartridge 700 with a cover removed, according to another embodiment. Froth-liquid/gas separator 500 disposed within print cartridge 700. FIG. 7B is an isometric view of a cover 720 of print cartridge 700 with body 710 removed. Note that an inlet check valve 740 is located at an end of froth-liquid/gas separator 500 opposite cover 720. Inlet check valve 740 is analogous to inlet check valve 650 of FIG. 6 and is coupled to helical flow passage 540. A weld 750, such as a laser weld, secures froth-liquid/gas separator 500 to cover 720. FIG. 7C illustrates cover 720 with housing 550 and filter 530 removed from froth-liquid/gas separator 500, thereby exposing core 510. Core 510 is received, e.g., press fit, in a vent hole 760 passing through cover 720. In operation, gas that exits helical flow passage 540, as shown in FIG. 5A, is vented to an atmosphere external to print cartridge 700 through vent hole 760.

CONCLUSION

Although specific embodiments have been illustrated and described herein it is manifestly intended that the scope of the claimed subject matter be limited only by the following claims and equivalents thereof.

What is claimed is:

1. A froth-liquid/gas separator comprising:
   a housing;
   a flow passage defined between first and second bounding surfaces within the housing, wherein the first bounding surface is a non-porous surface formed by a plate located within the housing, and at least a portion of the second bounding surface is formed by a filter located within the housing;
   wherein a separation distance between the first and second bounding surfaces produces a flow of liquid regions interspersed between gaseous regions within the flow passage during operation, with each of the liquid and gaseous regions spanning the separation distance between the first and second bounding surfaces.

2. The froth-liquid/gas separator of claim 1, wherein a first pressure exists at an inlet of the flow passage and a second pressure exists at an outer surface of the filter so as to establish a pressure differential across the filter.

3. The froth-liquid/gas separator of claim 1, wherein an exit of the flow passage is vented to atmosphere.

4. A froth-liquid/gas separator comprising:
   a flow passage defined between first and second bounding surfaces, wherein the first bounding surface is a non-porous surface and at least a portion of the second bounding surface is a filter;
   wherein a separation distance between the first and second bounding surfaces produces a flow of liquid regions interspersed between gaseous regions within the flow passage during operation, with each of the liquid and gaseous regions spanning the separation distance between the first and second bounding surfaces; and
   wherein the flow passage is serpentine or helical.

5. The froth-liquid/gas separator of claim 1, wherein the separation distance between the first and second bounding surfaces is less than or equal to a size of gas bubbles in the froth before the froth enters the flow passage.

6. The froth-liquid/gas separator of claim 5, wherein liquid from the liquid regions is substantially removed from the flow of liquid regions interspersed between gaseous regions as the liquid is drawn through the filter.

7. The froth-liquid/gas separator of claim 1, wherein the froth-liquid/gas separator is disposed in a reservoir.

8. The froth-liquid/gas separator of claim 1 further comprising a first check valve coupled to an inlet of the flow passage and a second check valve fluidly coupled to an outer surface of the filter exteriorly of the flow passage.

9. The froth-liquid/gas separator of claim 8, wherein the first and second check valves are configured to at least temporarily maintain a pressure differential across the filter during operation of the froth-liquid/gas separator.

10. The froth-liquid/gas separator of claim 1, wherein the separation distance is about 0.5 mm to about 2.0 mm.

11. A froth-liquid/gas separator comprising:
    a housing;
    a filter that divides an interior of the housing into first and second portions; and
    a flow passage located within the housing and defined between a non-porous surface formed by a plate located in the first portion of the interior of the housing and at least a portion of the filter;
    wherein the non-porous surface and the at least a portion of the filter form first and second bounding surfaces;
    wherein a separation distance between the first and second bounding surfaces produces a flow of liquid regions interspersed between gaseous regions within the flow passage during operation, with each of the liquid and gaseous regions spanning the separation distance between the first and second bounding surfaces; and
    wherein liquid from the liquid regions is substantially removed from the flow of liquid regions interspersed between gaseous regions by drawing the liquid through the filter.

12. The froth-liquid/gas separator of claim 11, wherein a first pressure exists at an inlet of the flow passage and a second pressure exists at an outer surface of the filter so as to establish a pressure differential across the filter.

13. A froth-liquid/gas separator comprising:
    a housing;
    a filter that divides an interior of the housing into first and second portions; and
    a flow passage located within the housing and defined between a non-porous surface in the first portion of the interior of the housing and at least a portion of the filter;
    wherein the non-porous surface and the at least a portion of the filter form first and second bounding surfaces;
    wherein a separation distance between the first and second bounding surfaces produces a flow of liquid regions interspersed between gaseous regions within the flow passage during operation, with each of the liquid and gaseous regions spanning the separation distance between the first and second bounding surfaces;
    wherein liquid from the liquid regions is substantially removed from the flow of liquid regions interspersed between gaseous regions by drawing the liquid through the filter; and
    wherein the flow passage is serpentine or helical.

14. The froth-liquid/gas separator of claim 11 further comprising a first check valve fluidly coupled to an inlet of the flow passage and a second check valve fluidly coupled to the second portion of the interior of the housing.

15. The froth-liquid/gas separator of claim 14, wherein the first and second check valves are configured to at least temporarily maintain a pressure differential across the filter during operation of the froth-liquid/gas separator.

16. The froth-liquid/gas separator of claim 14, wherein the separation distance between the non-porous surface and the filter is at most equal to a size of gas bubbles in the froth before the froth enters the flow passage.

17. A froth-liquid/gas separator comprising:
    a cylindrical core;

a helical rib disposed on an outer curved surface of the cylindrical core;
a filter disposed around the cylindrical core in contact with the helical rib to form a helical flow passage between the core and the filter; and
a housing disposed around the filter.

18. The froth-liquid/gas separator of claim 17, wherein an inlet of the flow passage is coupleable to a first pressure and an outlet of the housing is coupleable to a second pressure for establishing a pressure differential across the filter.

19. The froth-liquid/gas separator of claim 17, wherein froth is configured to flow through the helical flow passage as a liquid component of the froth is drawn through the filter.

20. The froth-liquid/gas separator of claim 17, wherein the core has a hollow center that is fluidly coupled to an exit of the helical flow passage.

21. The froth-liquid/gas separator of claim 17 further comprising a first check valve coupled to an inlet of the helical flow passage and a second check valve coupled to an exit of the housing.

22. The froth-liquid/gas separator of claim 21, wherein the first and second check valves are configured to establish a pressure differential across the filter.

23. The froth-liquid/gas separator of claim 17, wherein the froth-liquid/gas separator is disposed in a reservoir.

24. A fluid handling system comprising:
a froth-liquid/gas separator comprising:
a flow passage defined between a non-porous surface and at least a portion of a filter, wherein the flow passage is configured to direct froth therethrough as a liquid component of the froth is drawn through the filter;
a reservoir fluidly coupled to the froth-liquid/gas separator; and
a first check valve fluidly coupled between an inlet of the flow passage and the reservoir and a second check valve fluidly coupled between the reservoir and an outer surface of the filter exteriorly of the flow passage,
wherein the reservoir is coupled to a fluid-ejection device by a two-way pump.

25. The fluid handling system of claim 24, wherein the first and second check valves are configured to at least temporarily maintain a pressure differential across the filter.

26. The fluid handling system of claim 24, wherein the fluid ejection device is a print head.

27. The fluid handling system of claim 24, wherein the fluid handling system is a portion of an imaging device.

28. A print cartridge comprising:
a first housing having a cover;
a froth-liquid/gas separator disposed within the first housing, the froth-liquid/gas separator, comprising:
a cylindrical core;
a helical rib disposed on an outer curved surface of the cylindrical core;
a filter disposed around the cylindrical core in contact with the helical rib to form a helical flow passage between the core and the filter; and
a second housing disposed around the filter, wherein the second housing is secured to the cover.

29. The print cartridge of claim 28, wherein the cylindrical core is received in a vent hole passing through the cover so that the helical flow passage is fluidly coupled to the vent hole.

30. The print cartridge of claim 28, wherein the froth-liquid/gas separator further comprises an inlet check valve located at an end of the second housing opposite the cover of the first housing.

31. The print cartridge of claim 28, wherein the second housing is secured to the cover of the first housing by laser welding.

32. A method of extracting liquid from froth, comprising:
directing the froth through a flow passage bounded by a filter and a non-porous surface;
producing a flow of liquid regions interspersed between gaseous regions within the flow passage, with each of the liquid and gaseous regions spanning the separation distance between the filter and the non-porous surface; and
drawing the liquid from the liquid regions through the filter.

33. The method of claim 32, wherein drawing the liquid through the filter is in response to creating a pressure differential across the filter.

34. The method of claim 33, wherein the pressure differential is created by a pump operating in a suction mode.

35. The method of claim 33, wherein the pressure differential is created by a first check valve at the inlet of the flow passage and a second check valve fluidly coupled to the filter exteriorly of the flow passage and a two-way pump that when operating in a first direction, causes froth to flow through the first check valve while the second check valve is closed and produces suction when operating in a second direction opposite the first direction to open the second check valve while the first check valve is closed.

36. The method of claim 32 further comprises directing gas from the gaseous regions through an end of the flow passage.

37. The method of claim 32, wherein the flow passage is helical or serpentine.

38. A method of extracting liquid from froth, comprising:
directing the froth through a helical flow passage bounded by a filter and a non-porous cylindrical surface; and
drawing liquid from the froth through the filter as the froth flows through the helical flow passage.

39. The method of claim 38 further comprises directing gas from the froth through an end of the helical flow passage.

* * * * *